Patented Mar. 30, 1943

2,315,037

UNITED STATES PATENT OFFICE 2,315,037

CHLORINATION OF PROPYLENE POLYMERS TO GIVE RESINS

Lewis A. Bannon, Roselle, N. J., assignor, by mesne assignments, to Jasco, Incorporated, a corporation of Louisiana No Drawing. Application October 7, 1939,
Serial No. 298,404

7 Claims. (Cl. 260—94)

This invention relates to chlorinated polymeric materials, and relates particularly to propylene-containing polymers in which a substantial portion of hydrogen has been replaced by chlorine.

A considerable number of the olefinic substances can be polymerized into high molecular weight polymers of various physical and chemical characteristics, and various molecular weights. Of the polymerizable olefins, isobutylene polymerizes the most readily, and to the highest molecular weights. It has been found however, that propylene also can be polymerized at low temperatures ranging from 0° C. to —100° C. by various methods such as the application to the material of a boron fluoride water complex, or $AlCl_3$ or its complexes and other Friedel-Crafts type catalyst to produce a relatively heavy oily polymer of propylene. This oil is reactive with chlorine to produce a chlorinated polymer which has the new and unexpected properties of being a solid which is physically hardly distinguishable from chlorinated solid polyisobutylene.

In one method of practicing the invention, a propylene polymer having a molecular weight of 500 to 2000 as indicated by a viscosity of 124 at 210° F. is dissolved in carbon tetrachloride and treated at atmospheric pressure with chlorine at temperatures of 50° C. to 60° C. preferably in the presence of a mercury vapor lamp. After chlorinating for a period of approximately 2½ hours, the material is washed while in the carbon tetrachloride solution with dilute caustic solution, and the carbon tetrachloride removed by pouring the solution slowly into boiling water. The chlorinated product is then dried in the vacuum oven to produce a white, amorphous powder having a chlorine content of 59%.

The characteristic properties of this substance in comparison with chlorinated polyisobutylene, and chlorinated rubber, are shown in the following table:

| Sample | Per cent chlorine | Stability at 125° C. for 24 hrs. | Absolute viscosity of 20% sol. in toluol |
|---|---|---|---|
| | | Per cent HCl evolved | Cp. |
| Typical chlorinated isobutylene polymer | 63.0 | 0.74 | 1.12 |
| Chlorinated propylene polymer | 59.0 | 0.93 | 1.01 |
| Chlorinated rubber | 68.4 | 0.217 | 5 |

The close similarity of the absolute viscosities of chlorinated propylene polymer and chlorinated polyisobutylene indicates that the molecular weights of the two are not only of the same order of magnitude, but are closely comparable. When the molecular weight of the unchlorinated polymer has a value of approximately 500–2000, the molecular weight of the chlorinated polymer has a value of approximately 1000 to 2000, whereas the molecular weight of chlorinated polyisobutylene may range upward from about 6000 to undetermined higher values. Nevertheless the physical properties of the two chlorinated substances are nearly the same.

The chlorinated material is soluble in aromatic hydrocarbon solvents and also in many of the varnish and lacquer oils and solvents. It is fully compatible with substantially all of the usual varnish gums and resins. The material is thermoplastic in the temperature range of 120° C. to 150° C. and is highly resistant to thermal breakdown and resistant to oxidation, hydrogenation and to most of the acid and alkaline substances. It mixes readily with a wide range of fillers, and when so mixed is a valuable moulding material.

The chlorinated propylene polymer is compatible in all proportions with chlorinated polyisobutylene, and in fact the properties of the two are substantially identical.

The material is compatible with rubber and also with chlorinated rubber and chlorinated hydrogenated rubber especially when chlorinated to lower chlorine contents.

A satisfactory embodiment of the invention is presented above. Alternatively, the propylene polymer may be chlorinated in the dark at pressures above atmospheric, and at temperatures above atmospheric, the pressure and temperature being adjusted according to the desired amount of chlorine. It may be noted that the material chlorinates more easily, than most of the other polymeric substances to a hard thermoplastic material which is suitable for moulding, paints and varnishes, and as a protective coating material for acid and alkali proofing.

The material may also be chlorinated in admixture with various other substances such as natural rubber or polyisobutylene or other of the mixed olefinic polymers. Chlorination in the presence of rubber increases the thermal stability and neutralizes the presence of impurities.

While there are above disclosed but a limited number of embodiments of the invention, it is possible to produce still other embodiments without departing from the inventive concepts herein disclosed, and it is therefore desired that only such limitations be imposed on the appended claims as are stated therein or required by the prior art.

The invention claimed is:

1. In a method of preparing a solid thermoplastic resin from a resin prepared by polymerizing propylene at a temperature from 0° C. to −110° C. by the application thereto of a Friedel-Crafts type catalyst to yield an oily polymer of propylene, the step of chlorinating the oily polymer to produce a solid thermoplastic resin containing a substantial percentage of chlorine.

2. In a method of preparing a solid thermoplastic resin from a resin prepared by polymerizing propylene at a temperature from 0° C. to −110° C. by the application of a Friedel-Crafts type catalyst to yield an oily polymer of propylene having a molecular weight within the approximate range of 500 to 2000, the step of chlorinating the oily polymer in the presence of light energy to produce a solid thermoplastic resin containing a substantial percentage of chlorine.

3. In a method of preparing a solid thermoplastic resin from a resin prepared by polymerizing propylene at a temperature from 0° C. to −110° C. by the application thereto of a Friedel-Crafts type catalyst to yield an oily polymer of propylene having a molecular weight within the approximate range of 500 to 2000, the step of chlorinating the oily polymer in solution to produce a solid thermoplastic resin containing a substantial percentage of chlorine.

4. In a method of preparing a solid thermoplastic resin from a resin prepared by polymerizing propylene at a temperature from 0° C. to −110° C. by the application thereto of a Friedel-Crafts type catalyst to yield an oily polymer of propylene having a molecular weight within the approximate range of 500 to 2000, the step of chlorinating the oily polymer in solution in carbon tetrachloride to produce a solid thermoplastic resin containing a substantial percentage of chlorine.

5. In a method of preparing a solid thermoplastic resin from a resin prepared by polymerizing propylene at a temperature from 0° C. to −110° C. by the application thereto of a Friedel-Crafts type catalyst to yield an oily polymer of propylene having a molecular weight within the approximate range of 500 to 2000, the step of chlorinating the oily polymer in solution in the presence of polyisobutylene to produce a solid thermoplastic resin containing a substantial percentage of chlorine.

6. In a method of preparing a solid thermoplastic resin from a resin prepared by polymerizing propylene at a temperature from 0° C. to −110° C. by the application thereto of a Friedel-Crafts type catalyst to yield an oily polymer of propylene having a molecular weight within the approximate range of 500 to 2000, the step of chlorinating the oily polymer in solution in the presence of natural rubber to produce a solid thermoplastic resin containing a substantial percentage of chlorine.

7. A composition of matter comprising a chlorinated polypropylene characterized by thermoplasticity, a high thermo stability, a white color and a softening point between 120° C. and 150° C.

LEWIS A. BANNON.